United States Patent
Yang

(10) Patent No.: US 12,449,078 B2
(45) Date of Patent: Oct. 21, 2025

(54) FLUID CONNECTOR, AND SEALING STRUCTURE

(71) Applicant: SHENZHEN ENVICOOL SMART CONNECTION TECHNOLOGY CO., LTD., Shenzhen Guangdong (CN)

(72) Inventor: Shuliang Yang, Shenzhen Guangdong (CN)

(73) Assignee: SHENZHEN ENVICOOL SMART CONNECTION TECHNOLOGY CO., LTD., Guangdong (CN)

( * ) Notice: Subject to any disclaimer, the term of this patent is extended or adjusted under 35 U.S.C. 154(b) by 38 days.

(21) Appl. No.: 18/276,209

(22) PCT Filed: Jan. 19, 2022

(86) PCT No.: PCT/CN2022/072639
§ 371 (c)(1),
(2) Date: Aug. 7, 2023

(87) PCT Pub. No.: WO2022/166580
PCT Pub. Date: Aug. 11, 2022

(65) Prior Publication Data
US 2024/0093819 A1 Mar. 21, 2024

(30) Foreign Application Priority Data
Feb. 7, 2021 (CN) .......................... 202120357233.2

(51) Int. Cl.
*F16L 37/34* (2006.01)
*F16L 37/23* (2006.01)
(Continued)

(52) U.S. Cl.
CPC .............. *F16L 37/34* (2013.01); *F16L 37/23* (2013.01); *F16L 37/35* (2013.01); *F16L 37/413* (2013.01)

(58) Field of Classification Search
CPC ......... F16L 37/35; F16L 37/34; F16L 37/413; F16L 37/23
See application file for complete search history.

(56) References Cited

U.S. PATENT DOCUMENTS 2,457,251 A * 12/1948 Main, Jr. .................. F16L 37/34
137/614.04
2,545,796 A * 3/1951 Scheiwer ................ F16L 37/23
137/614.04
(Continued)

FOREIGN PATENT DOCUMENTS

CN 201836574 U * 5/2011
CN 202176739 U * 3/2012
(Continued)

OTHER PUBLICATIONS

International Search Report for PCT/CN2022/072639 mailed Apr. 1, 2022, ISA/CN.
(Continued)

*Primary Examiner* — David Colon-Morales
(74) *Attorney, Agent, or Firm* — Yue (Robert) Xu; Apex Attorneys at Law, LLP

(57) ABSTRACT

A sealing structure and a fluid connector are provided. The sealing structure for a fluid connector includes a first sealing ring and a first sleeve, where the first sleeve is arranged in the fluid connector and is hollow inside to form a first fluid channel, and the first sealing ring is arranged on an inner surface of the first sleeve for sealing and communication of the first fluid channel.

15 Claims, 2 Drawing Sheets

(51) Int. Cl.
*F16L 37/35* (2006.01)
*F16L 37/413* (2006.01)

(56) References Cited

U.S. PATENT DOCUMENTS

| | | | | |
|---|---|---|---|---|
| 3,039,794 | A * | 6/1962 | De Cenzo | F16L 37/34 285/317 |
| 3,120,968 | A * | 2/1964 | Calvin | F16L 37/34 285/321 |
| 3,613,726 | A * | 10/1971 | Torres | F16L 37/23 285/86 |
| 4,086,939 | A * | 5/1978 | Wilcox | F16L 37/34 251/149.6 |
| 4,219,048 | A * | 8/1980 | Ekman | F16L 37/34 137/614.04 |
| 4,429,713 | A * | 2/1984 | Walter | F16L 37/34 251/149.8 |
| 4,892,117 | A * | 1/1990 | Spalink | F16L 37/23 137/614.03 |
| 4,917,149 | A | 4/1990 | Grantham | |
| 6,681,803 | B2 * | 1/2004 | Taneya | F16L 37/23 251/149.6 |
| 9,909,703 | B2 * | 3/2018 | Van Scyoc | F16L 37/32 |
| 9,958,101 | B2 * | 5/2018 | Gennasio | F16L 37/34 |
| 10,253,911 | B1 * | 4/2019 | Quang | F16L 37/123 |
| 10,612,708 | B2 * | 4/2020 | B.V. | F16L 37/23 |
| 11,040,868 | B2 * | 6/2021 | Peattie | B67D 7/44 |
| 11,486,528 | B2 * | 11/2022 | Nick | F16L 37/23 |
| 2017/0350548 | A1 | 12/2017 | Tiberghien | |
| 2019/0152762 | A1 | 5/2019 | Peattie et al. | |

FOREIGN PATENT DOCUMENTS

| | | | | |
|---|---|---|---|---|
| CN | 109296861 A | * | 2/2019 | F16L 37/36 |
| CN | 109416144 A | | 3/2019 | |
| CN | 209671841 U | * | 11/2019 | |
| CN | 112128493 A | * | 12/2020 | F16L 37/23 |
| DE | 3918250 A1 | * | 12/1990 | |
| DE | 4035453 A1 | * | 6/1992 | |
| FR | 2558928 A1 | | 8/1985 | |
| GB | 916256 A | * | 1/1963 | |
| WO | WO-2014087187 A1 | * | 6/2014 | F16L 37/23 |

OTHER PUBLICATIONS

European Search Report issued on Feb. 13, 2025 for the European counterpart application No. 22748859.0.

* cited by examiner

FLUID CONNECTOR, AND SEALING STRUCTURE

The present application is a national phase application of International Application No. PCT/CN2022/072639, filed on Jan. 19, 2022, which claims the priority of Chinese Patent Application No. 202120357233.2, titled "FLUID CONNECTOR AND SEALING STRUCTURE", filed on Feb. 7, 2021 with the China National Intellectual Property Administration, which are incorporated herein by reference in their entireties.

FIELD

The present application relates to the technical field of connectors, and in particular to a fluid connector and a sealing structure.

BACKGROUND

In general, the conventional fluid connectors are sealed by a sealing ring provided on a telescopic rod, and impurities are easy to accumulate in a gap of the sealing ring, resulting in sealing failure and fluid leakage of the fluid connectors.

Herein, it should be noted that, the technical contents provided in this section are intended to assist understanding of the present application by those skilled in the art, and do not necessarily constitute the conventional technology.

SUMMARY

In view of this, an object of the present application is to provide a sealing structure to improve a sealing ability of a fluid connector. A fluid connector is further provided according to an embodiment of the present application.

In order to achieve the above object, the following solutions are provided according to the present application.

A sealing structure for a fluid connector includes a first sealing ring and a first sleeve, where the first sleeve is arranged in the fluid connector and is hollow inside to form a first fluid channel. The first sealing ring is arranged on an inner surface of the first sleeve for sealing and communication of the first fluid channel.

In an embodiment, in the above sealing structure, the first sleeve is provided with a valve core which is slidably arranged in the first sleeve, and an outer periphery of the valve core is in sealing connection with the first sealing ring to close the first fluid channel.

In an embodiment, in the above sealing structure, the sealing structure further includes a second sealing ring and a first valve sleeve, where the first valve sleeve is arranged in the fluid connector, is hollow inside to form a second fluid channel and is connected with the first sleeve, and the second sealing ring is arranged on an inner surface of the first valve sleeve for sealing and communication of the second fluid channel.

In an embodiment, in the above sealing structure, the sealing structure further includes a third sealing ring and a valve rod, where the valve rod is hollow inside and is slidably arranged in the first valve sleeve. The valve rod is further provided with a fluid through-hole through which an outer periphery of the valve rod is in communication with the second fluid channel, and the second sealing ring and the third sealing ring are both arranged on the inner surface of the first valve sleeve, and are respectively located at two sides of the fluid through-hole in an axial direction of the valve rod.

In an embodiment, in the above sealing structure, the sealing structure further includes at least one fourth sealing ring and a second sleeve, where the first valve sleeve is slidably arranged in the second sleeve, and the fourth sealing ring is sealingly arranged between the second sleeve and the first valve sleeve.

In an embodiment, in the above sealing structure, the sealing structure includes multiple fourth sealing rings, and the multiple fourth sealing rings are spaced apart in an axial direction of the second sleeve.

In an embodiment, in the above sealing structure, the sealing structure further includes a first jacking spring, the first jacking spring is arranged in the first sleeve and one end of the first jacking spring is connected to the valve core, and the valve core is in sealing connection with the first sealing ring.

In an embodiment, in the sealing structure, the sealing structure further includes a second jacking spring.

The second jacking spring is arranged in the first valve sleeve and sleeved outside the outer periphery of the valve rod, one end of the second jacking spring is connected to the first valve sleeve, and the first valve sleeve is in sealing connection with the valve rod through the second sealing ring.

A fluid connector includes the sealing structure according to any one of the above embodiments.

A fluid connector includes a male terminal and a female terminal which are detachably connected with each other, where the male terminal includes a first sleeve, a first sealing ring, and a valve core which is arranged in the first sleeve, and the female terminal includes a second sleeve, a first valve sleeve and a valve rod, where the first valve sleeve is slidably arranged between the second sleeve and the valve rod.

The first sleeve is hollow inside to form a first fluid channel, the first sealing ring is arranged on an inner surface of the first sleeve, the valve core is slidably arranged in the first fluid channel, and an outer periphery of the valve core is in sealing connection with the first sealing ring.

The valve rod is hollow inside to form a second fluid channel and is provided with a fluid through-hole through which an outer periphery of the valve rod is in communication with the second fluid channel, and the second sealing ring is arranged on the inner surface of the first valve sleeve for sealing the second fluid channel.

The valve rod is configured to push the valve core to separate from the first sealing ring in a case that the male terminal and the female terminal are in connection with each other, and the valve rod is inserted into the first sleeve and the fluid through-hole is at least partially located in the first sleeve.

In an embodiment, in the above fluid connector, the valve rod is configured to push the valve core to separate from the first sealing ring in the case that the male terminal and the female terminal are in connection with each other, the valve rod is inserted into the first sleeve so that the fluid through-hole is located in the first sleeve, and the first sealing ring is located at a side, away from the valve core, of the fluid through-hole, and is in sealing connection with the valve rod.

In an embodiment, in the above fluid connector, one end of the valve core and one end of the valve rod, which are in contact with each other, have the same shape of an end surface and the same outer diameter at the outer periphery.

In an embodiment, in the fluid connector, the female terminal further includes a locking sleeve, a locking steel ball and a third jacking spring, where the locking sleeve is sleeved outside the second sleeve. An accommodating hole for accommodating the locking steel ball is formed in an outer side wall at one end, configured to be connected with the female terminal, of the second sleeve, the third jacking spring is arranged between the second sleeve and the locking sleeve, and one end of the third jacking spring abuts against the locking sleeve.

The locking sleeve is slidable between a first position and a second position in an axial direction of the second sleeve. When the locking sleeve is located at the first position, the locking sleeve is configured to press the locking steel ball into the accommodating hole, and when the locking sleeve is located at the second position, the locking steel ball is partially extended out between the locking sleeve and the second sleeve.

In an embodiment, in the fluid connector, an outer surface of the valve core and an outer surface of the valve rod each is coated with polytetrafluoroethylene.

A sealing structure for a fluid connector is provided according to the present application. The sealing structure includes a first sealing ring and a first sleeve, where the first sleeve is arranged in the fluid connector and is hollow inside to form a first fluid channel, and the first sealing ring is arranged on an inner surface of the first sleeve for sealing and communication of the first fluid channel. The fluid connector is communicated with a fluid pipeline and the first sleeve is arranged in the fluid connector. The hollow first fluid channel is arranged in the first sleeve, so that the first fluid channel is sealed and communicated by opening or closing of the first fluid channel through the first sealing ring in the fluid connector, thereby realizing the function of connection or disconnection of the fluid connector to or from different flow paths. By arranging the structure that the first sealing ring cooperates with the first sleeve to allow the flow paths in the fluid connector to be communicated or sealed, the first sealing ring can be always in close contact with the inner surface of the first sleeve in a process of fluid circulation or disconnection, thereby preventing the fluid from leaking from the inner surface of the first sleeve and ensuring the sealing performance.

BRIEF DESCRIPTION OF THE DRAWINGS

The above and other objects, features, and advantages of the present application will be clearer from the following description of embodiments of the present application with reference to the drawings. In the drawings.

DETAILED DESCRIPTION OF THE EMBODIMENTS

The present application is described on the basis of the embodiments hereinafter, but is not limited to these embodiments.

Figure 1:
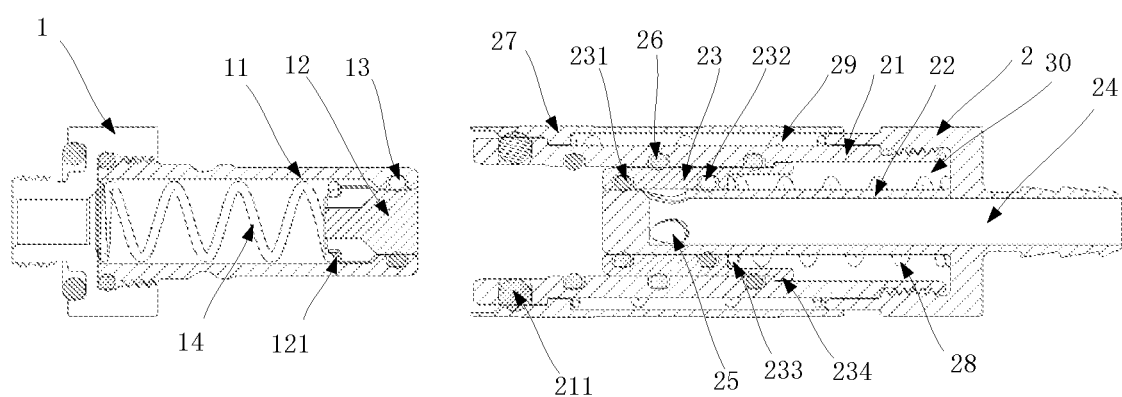
FIG. 1 is a schematic structural view of a fluid connector according to an embodiment of the present application in an initial state.
Figure 2:
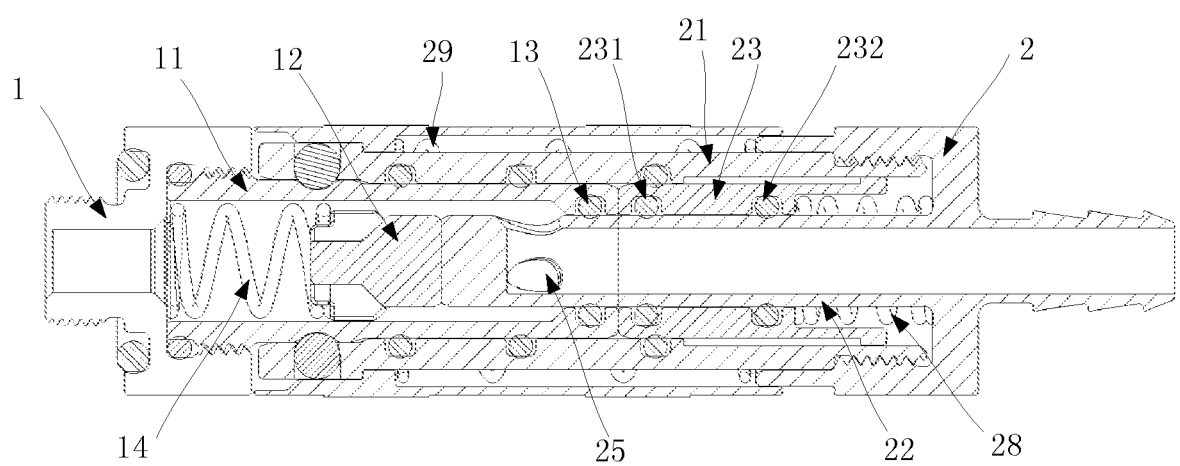
FIG. 2 is a schematic structural view of the fluid connector according to the embodiment of the present application in an operating state.

As shown in FIG. 1 and FIG. 2, FIG. 1 is a schematic structural view of a fluid connector according to an embodiment of the present application in an initial state, and FIG. 2 is a schematic structural view of the fluid connector according to the embodiment of the present application in an operating state.

A sealing structure for a fluid connector is provided according to this embodiment. The sealing structure may include a first sealing ring 13 and a first sleeve 11, where the first sleeve 11 is arranged in the fluid connector and is hollow inside to form a first fluid channel (not numbered in the figure). The first sealing ring 13 is arranged on an inner surface of the first sleeve 11 for sealing and communication of the first fluid channel. Specifically, the first fluid channel is a path through which the fluid in an inner cavity of the first sleeve 11 passes. It can be understood that the fluid connector is communicated with a fluid pipeline, and the first sleeve 11 is arranged in the fluid connector. The hollow first fluid channel is arranged in the first sleeve 11, so that the first fluid channel may be sealed and communicated by opening or closing of the first fluid channel through the first sealing ring 13 in the first sleeve 11, thereby realizing the function of connection or disconnection of the fluid connector to or from different flow paths. By arranging a structure in which the first sealing ring 13 cooperates with the first sleeve 11 to allow the flow path in the fluid connector to be communicated or sealed, the first sealing ring 13 can be always in close contact with the inner surface of the first sleeve 11 in a process of fluid circulation or disconnection, thereby preventing fluid from leaking from the inner surface of the first sleeve 11 and ensuring the sealing performance.

The first sealing ring 13 may be an elastic deformation structure that fills an inner space of the first sleeve 11 to be deformed radially from circumferential direction to the interior. The first sealing ring 13 is subjected to a fluid pressure at one axial side of the first sleeve 11 and then is squeezed by the fluid pressure. After the pressure exceeds a predetermined pressure value, the first sealing ring 13 is pressed by the fluid and deforms along a radial direction to form an intermediate channel, thereby realizing the communication of the first fluid channel. For example, the elastic deformation structure may be a porous elastic film composed of high molecular polymer or an elastic microvalve structure. Specifically, the first sealing ring 13 may be configured to deform, in a case that a bearing pressure exceeds 0.35 MPa, to allow the first fluid channel to be communicated, otherwise has a closed filling structure.

In an embodiment of the present application, the first sleeve 11 may be provided with a valve core 12 which is slidably arranged in the first sleeve 11, and an outer periphery of the valve core 12 is in sealing connection with the first sealing ring 13 to close the first fluid channel. The first fluid channel in the first sleeve 11 is blocked and opened by the sliding of the valve core 12. When the valve core 12 is sealingly connected with the first sealing ring 13, the fluid circulation is blocked, thereby realizing the blocking. After the valve core 12 slides away from the first sealing ring 13, the first fluid channel in the first sleeve 11 is communicated.

In an embodiment of the present application, the sealing structure may further include a second sealing ring 231 and a first valve sleeve 11, where the first valve sleeve 11 is arranged in the fluid connector, is hollow inside to form a second fluid channel and is connected with the first sleeve 11, and the second sealing ring 231 is arranged on an inner surface of the first valve sleeve 23 for sealing and communication of the second fluid channel. It can be understood that the second sealing ring 231 may be the same elastic deformation structure as the first sealing ring 13.

The sealing structure may further include a third sealing ring 232 and a valve rod 22. The valve rod 22 is hollow inside and is slidably arranged in the first valve sleeve 23. The valve rod 22 is further provided with a fluid through-hole 25 through which an outer periphery of the valve rod 22 is in communication with the second fluid channel. The second sealing ring 231 and the third sealing ring 232 are both arranged on the inner surface of the first valve sleeve 23, and the second sealing ring 231 and the third sealing ring 232 are respectively located at two sides of the fluid through-hole 25 in an axial direction of the valve rod 22.

The communication and closure between the first fluid channel and the second fluid channel is realized by the abutment and separation of the valve core 12 and the valve rod 22. Specifically, the valve rod 22 abuts against the valve core 12 to push the valve core 12 to slide in the first sleeve 11. At this time, the first sleeve 11 abuts against the first valve sleeve 23, and the valve rod 22 slides relatively in the first sleeve 11 and the first valve sleeve 23. The valve rod 22 has a hollow structure, and the outer periphery of the valve rod 22 is in sliding contact with the first sealing ring 13, the second sealing ring 231 and the third sealing ring 232 during the sliding process, so as to ensure the tightness between the outer periphery and the first sleeve 11 and between the outer periphery and the first valve sleeve 23. An end of the valve rod 22 is provided with a fluid through-hole 25. When the second fluid channel is closed, the fluid through-hole 25 is located between the second sealing ring 231 and the third sealing ring 232, and a tight-fitting sealing structure is formed between the inner surface of the first valve sleeve 23 and the outer periphery of the valve rod 22. When the first fluid channel is communicated with the second fluid channel, the first sealing ring 13 is located at a side where the fluid through-hole 25 is away from the valve core 12 and connected with the outer periphery of the valve rod 22 to ensure the tightness between the outer periphery of the valve rod 22 and the first sleeve 11 and between the outer periphery and the first valve sleeve 23.

The sealing structure further includes at least one fourth sealing ring 26 and a second sleeve 21. The first valve sleeve 23 is slidably arranged in the second sleeve 21, and the fourth sealing ring 26 is sealingly arranged between the second sleeve 21 and the first valve sleeve 23. The first sleeve 11 and the first valve sleeve 23 slide in an axial direction of the second sleeve 21. Considering a change in sliding position of the first valve sleeve 23 on the valve rod 22 and the sealing performance of a connection position of the first valve sleeve 23 and the first sleeve 11, the sealing structure may include multiple fourth sealing rings 26, and the multiple fourth sealing rings are spaced apart in the axial direction of the second sleeve 21, so as to ensure that the connection position of the first sleeve 11 and the first valve sleeve 23 is always located among the more than one fourth sealing ring 26 during the sliding process, thereby avoiding fluid leakage between the first valve sleeve 23 and the first sleeve 11.

In an embodiment of the present application, the sealing structure may include a first jacking spring 14. The first jacking spring 14 is arranged in the first sleeve 11 and one end of the first jacking spring 14 is connected to the valve core 12, so that the valve core 12 is in sealing connection with the first sealing ring 13 in the first sleeve 11. It can be understood that the valve core 12 may slide in the first sleeve 11 through an elastic deformation of the first jacking spring 14 to connect with or separate from the first sealing ring 13. When the valve core 12 is sealingly connected to the first sealing ring 13, the first fluid channel is closed, and when the valve core 12 is separated from the first sealing ring 13, the first fluid channel may be communicated. Alternatively, the first fluid channel may be communicated or closed based on the specific structure of the sealing ring. For example, the sealing ring may be a thin-film micro valve composed of polymer as mentioned above, and the communicating or closing of the channel is controlled by an indicator such as pressure. When the valve core 12 is separated from the first sealing ring 13, if the indicator in the channel does not reach a predetermined value, the first fluid channel is still closed.

In an embodiment of the present application, the sealing structure may further includes a second jacking spring 28. The second jacking spring 28 is arranged in the first valve sleeve 23 and sleeved outside an outer periphery of the valve rod 22. One end of the second jacking spring 28 is connected to the first valve sleeve 23, so that the first valve sleeve 23 is in sealing connection with the valve rod 22 through the second sealing ring.

A fluid connector including the sealing structure described in the above embodiments is further provided according to an embodiment of the present application. Reference is made to the above embodiments for the beneficial effects of the fluid connector brought by the sealing structure.

A fluid connector is provided according to another embodiment of the present application. The fluid connector includes a male terminal 1 and a female terminal 2 detachably connected with each other. The male terminal 1 includes a first sleeve 11 and a valve core 12. Specifically, the detachable connection includes plug-in fitting, butt locking and the like.

The female terminal 2 includes a second sleeve 21 and a valve rod 22, and a first valve sleeve 23 is slidably arranged between the second sleeve 21 and the valve rod 22.

The first sleeve 11 is hollow inside to form a first fluid channel, and the first sealing ring 13 is arranged on an inner surface of the first sleeve 11. The first sealing ring 13 is in press-fitting with an outer periphery of the valve core 12 to seal the first sleeve 11.

The valve rod 22 has an end which abuts against and fits with the valve core 12, and an outer periphery which is in sliding press-fitting with the first sealing ring 13. The valve rod 22 is internally provided with a second fluid channel 24, and an end of the valve rod 22 is provided with a fluid through-hole 25 through which an outer periphery of the valve rod 22 is in communication with the second fluid channel 24. The first sleeve 11 extends into the second sleeve 21 and abuts against the first valve sleeve 23, while the valve rod 22 abuts against the valve core 12. With the male terminal 1 and the female terminal 2 being plugged in and mounted in place, the valve rod 22 pushes the valve core 12 into the first sleeve 11, and the end of the valve rod 22 simultaneously extends into the first sleeve 11, so that the second fluid channel 24 is in communication with the first fluid channel inside the first sleeve 11. The first sealing ring 13 on the first sleeve 11 is in press-fitting with the outer periphery of the valve core 12 in an initial state, and is always tightly pressed on the outer periphery of the valve rod 22 to be in a sliding press-fitting state during the load-into process of the valve rod 22, thereby realizing that the fluid in the first sleeve 11 is blocked throughout the entire process of pushing of the valve rod 22 and the valve core 12, thereby avoiding leakage and improving the sealing capability.

In an embodiment, the second sealing ring and the third sealing ring are the second sealing ring 231 and third sealing ring 232 arranged at intervals along the axial direction of the valve rod between the first valve sleeve 23 and the valve rod 22, and the outer periphery of the valve rod 22 is in press-fitting with the second sealing ring 231 and the third sealing ring 232. The distance between the second sealing ring 231 and the third sealing ring 232 is greater than a length of the fluid through-hole 25. The first valve sleeve 23 abuts against the first sleeve 11, and the first valve sleeve 23 is pressed into the interior of the female terminal 2 as the male terminal 1 is mounted in place.

In this embodiment, when the male terminal 1 and the female terminal 2 are in connection with each other, the valve rod 22 may push the valve core 12 to separate from the first sealing ring 13. The valve rod 22 is inserted into the first sleeve 11, and the fluid through-hole 25 is at least partially located in the first sleeve 11, so that the first fluid channel is in communication with the second fluid channel 24. The valve rod 22 pushes the valve core 12 to separate from the first sealing ring, and the valve core 12 is retracted into the male terminal 1. In theory, the valve rod 22 partially extends into the first sealing ring 13 and falls between the fluid through-hole 25, so that the fluid may flow into the valve rod 22 from a gap between the first sleeve 11 and the valve rod 22, thereby allowing the fluid connector to be communicated.

In other embodiments, when the male terminal 1 is in connection with the female terminal 2, the valve rod 22 may push the valve core 12 to separate from the first sealing ring 13. The valve rod 22 is inserted into the first sleeve 11 so that the fluid through-hole 25 is located in the first sleeve 11, and the first sealing ring 13 is located at a side, away from the valve core 12, of the fluid through-hole 25, and is in sealing connection with the valve rod 22.

Further, the valve rod 22 abuts against the valve core 12. With the male terminal 1 and the female terminal 2 being plugged in and mounted in place, the valve core 12 is pressed into the first sleeve 11, and the first sealing ring 13 is arranged on an inner surface of the first sleeve 11. Considering that the outer periphery of the end of the valve rod 22 is provided with the fluid through-hole 25, the first sealing ring 13 falls within the length range of the fluid through-hole 25, which may cause the fluid leaking through the fluid through-hole 25 and flowing into the outer periphery of the valve rod 22 through the first sealing ring 13. A second sealing ring 231 and a third sealing ring 232 are arranged between the first valve sleeve 23 and the valve rod 22 along the axial direction of the valve rod, and the distance between the second sealing ring 231 and the third sealing ring 232 is controlled to be greater than the length of the fluid through-hole 25. In this way, when the valve rod 22 abuts against the valve core 12, the first sealing ring 13, the second sealing ring 231 and the third sealing ring 232 each is tightly pressed against the outer periphery of the valve rod 22, thereby effectively avoiding the leakage of the fluid flowing out through the fluid through-hole 25.

Moreover, the length distance between the second sealing ring 231 and the third sealing ring 232 along the axial direction of the valve rod is greater than the length of the fluid through-hole 25. After the first valve sleeve 23 and the valve rod 22 reset, the fluid through-hole 25 falls between the first valve sleeve 23 and the valve rod 22 to prevent the fluid in the second fluid channel 24 of the valve rod 22 from flowing out through the fluid through-hole 25, avoid the fluid leakage of the female terminal 2 and ensure the sealing performance.

In an embodiment of the present application, the fourth sealing ring 26 may be arranged on an inner circumference of the second sleeve 21 and in sliding press-fitting with an outer circumference of the first valve sleeve 23. The first sleeve 11 abuts against and is fitted with the first valve sleeve 23, and the first valve sleeve 23 is in sliding press-fitting with at least one fourth sealing ring 26, which is arranged on an inner surface of the second sleeve 21, in the sliding process. When leakage occurs at end surfaces at which the first sleeve 11 abuts against the first valve sleeve 23, the fluid is confined between the end surfaces and the fourth sealing ring 26 via the fourth sealing ring 26, realizing the sealing performance of the outer circumference of the first valve sleeve 23.

In an embodiment of the present application, the fourth sealing ring 26 may include multiple sealing rings spaced apart in the axial direction of the second sleeve 21, and the multiple fourth sealing rings 26 each is in sliding press-fitting with the outer periphery of the first sleeve 11 and the outer periphery of the first valve sleeve 23. The first sleeve 11 is connected to the first valve sleeve 23, and in the process of sliding in the second sleeve 21, the fluid flowing in from the end surfaces at which the first sleeve 11 abuts against the first valve sleeve 23 also flows out from the outer circumference of the first sleeve 11. The sealing structure includes multiple fourth sealing rings 26, and the multiple fourth sealing rings 26 are axially spaced apart along the inner circumference of the second sleeve 21. During the mutual sliding process of the first sleeve 11 and the first valve sleeve 23, the sliding position of the end surfaces at which the first sleeve 11 abuts against the first valve sleeve 23 is located between the more than one fourth sealing ring 26, so that the fluid is prevented from flowing out from a side of the male terminal 1 and from flowing into the second sleeve 21 at a side of the female terminal 2, thereby further improving the sealing performance.

The inner circumference and the outer circumference of the first valve sleeve 23 each is provided with a sealing ring. During the sliding process of the first valve sleeve 23, both of the inner circumference and the outer circumference may be sealed stably. The fluid is prevented from entering a spring mounting cavity 30 of the first valve sleeve 23 at the side of the female terminal 2. The direct overflow of the fluid is avoided at the male terminal 1, thereby generally improving the sealing performance.

In an embodiment of the present application, one end of the valve core 12 and one end of the valve rod 22, which are in contact with each other, may have the same shape of an end surface and the same outer diameter at the outer periphery. The outer periphery of the valve core 12 and the outer periphery of the valve rod 22 are of the same outer-diameter structure, and when the valve rod 22 is pressed into the first sleeve 11, the outer periphery of the valve rod 22 is in press-fitting with the inner circumference of the first sleeve 11, so that the sealing pressure of the first sealing ring 13 to the valve core 12 is consistent with that of the first sealing ring 13 to the valve rod 22, thereby ensuring the overall structural consistency.

Meanwhile, it is preferable to set a gap between the outer periphery of the valve core 12 and the inner wall of the first sleeve 11 to be 0.02 mm to 0.035 mm. After the corresponding valve rod 22 is mounted in place, there may be a sealing gap of 0.02 mm to 0.035 mm between the valve rod 22 and the inner wall of the first sleeve 11. Impurities in the fluid will not flow into the first sealing ring 13 through the inner surface of the first sleeve 11, thereby improving the safety of the first sealing ring 13 in long-term usage.

Further, the first sealing ring 13 may be arranged on the inner surface of the first sleeve 11 and always in press-fitting with the outer periphery of the valve core 12 or the valve rod 22. As shown in FIG. 2, when the male terminal 1 and the female terminal 2 are butted against each other, and the first fluid channel inside the first sleeve 11 is in communication with the second fluid channel 24 inside the valve rod 22, a gap through which the fluid passes is formed between the inner surface of the first sleeve 11 and the outer periphery of the valve core 12, and the fluid in the inner cavity of the first sleeve 11 enters the second fluid channel 24 through the fluid through-hole 25 at the end of the valve rod 22. When the valve rod 22 resets, the valve core 12 synchronously resets to the inner surface of the first sleeve 11, and the first fluid channel and the second fluid channel 24 each is closed. With such design, the gap in the channel through which the fluid flows is narrow, which reduces the retention and accumulation of the impurities, realizes the accurate resetting of the valve core 12, and further avoids the fluid leakage. It can be understood that in other embodiments, the direction of fluid flow may also be from the second fluid channel 24 to the first sleeve 11 through the fluid through-hole 25.

In an embodiment of the present application, the male terminal 1 may further includes a first jacking spring 14, which acts on the valve core 12 and the first sleeve 11 to drive the valve core 12 to slide in a first direction.

Further, the female terminal 2 further includes a second jacking spring 28, which is sleeved outside the valve rod 22 and acts on the first valve sleeve 23 and the second sleeve 21 to drive the second sleeve 21 to slide in a second direction. In the process of the male terminal 1 and the female terminal 2 being plugged in and mounted in place, the valve core 12 is pressed into the first sleeve 11, and the first valve sleeve 23 is pressed into the second sleeve 21. In view of this, the first direction is the direction in which the first jacking spring 14 pushes the valve core 12 to extend out of an opening position, which is an initial position of the valve core 12, of the first sleeve 11. Correspondingly, the second direction is the direction in which the second jacking spring 28 pushes the first valve sleeve 23 to extend out of an opening position, which is an initial position of the first valve sleeve 23, of the second sleeve 21.

In an embodiment of the present application, the second sleeve 21 is provided with a locking steel ball 211 and a locking sleeve 27. The locking sleeve 27 is sleeved outside the outer circumference of the second sleeve 21. The locking sleeve 27 is provided with an accommodating hole for accommodating the locking steel ball 211, and the female terminal 2 is further provided with a third jacking spring 29, which is elastically supported between the second sleeve 21 and the locking sleeve 27 for driving the locking sleeve 27 to slidably press or release the locking steel ball 211.

The locking sleeve 27 is slidable between a first position and a second position along the axial direction of the second sleeve 21. When the locking sleeve 27 is located at the first position as shown in FIG. 1, the locking sleeve 27 is configured to press the locking steel ball 211 into the accommodating hole. When the locking sleeve 27 is located at the second position as shown in FIG. 2, the locking steel ball 27 may be partially extended between the locking sleeve 27 and the second sleeve 21 for locking the male terminal 1 and the female terminal 2.

A first supporting step 121 for supporting the first jacking spring 14 extends from a press-in end of the valve core 12. The press-in end of the first valve sleeve 23 is provided with a second supporting step 233 for supporting the second jacking spring 28. The valve core 12 is located at the end of the first sleeve 11 in an initial state. An inner cavity of the first sleeve 11 is the inner cavity provided with the first jacking spring 14. The first jacking spring 14 abuts against the valve core 12 to provide an elastic force for telescopic resetting of the valve core 12. An inner diameter of the inner cavity of the first sleeve 11 is larger than the outer diameter of the sealing structure for the valve core 12. In an embodiment, the first jacking spring 14 of the valve core 12 may be mounted at one end, at which the outer diameter is tapered, of the first supporting step 121.

The second jacking spring 28 may be sleeved outside the outer periphery of the valve rod 22. Specifically, one end of the first valve sleeve 23 is provided with a second supporting step 233 arranged around the circumference of the valve rod 22, and the second jacking spring 28 is sleeved in an annular cavity formed by the second supporting step 233. The inner wall of the second sleeve 21 is provided with an annular groove, and the outer periphery of the first valve sleeve 23 is provided with a hanging lug 234 protruded from the outer periphery. The outer diameter of the hanging lug 234 is greater than that of the first valve sleeve 23. The hanging lug 234 slides and limits in the annular groove, so as to limit a protruding position of the second jacking spring 28 pushing the first valve sleeve 23. Preferably, a protruding end of the first valve sleeve 21 is flush with the end of the valve rod 22.

In the process of the male terminal 1 and the female terminal 2 being plugged in and mounted in place, the locking sleeve 27 avoids the locking steel ball 211. At this time, the locking sleeve 27 compresses the third jacking spring 29, exposing an end, avoiding the locking steel ball 211, of the locking sleeve 27, and the locking steel ball 211 is squeezed radially outward under the pressure, so that the outer circumference of the first sleeve 11 is in press-fitting with the inner wall of the second sleeve 21. After the male terminal 1 and the female terminal 2 are plugged in and mounted in place, the locking sleeve 27 is pushed by the third jacking spring 29, and the locking steel ball 211 is pressed radially inward and falls into a recess on the outer circumference of the first sleeve 11, thereby ensuring the stability of the structure of the male terminal 1 and the female terminal 2 being plugged in and mounted in place.

In an embodiment of the present application, the outer surface of the valve core 12 and the outer surface of the valve rod 22 each is coated with polytetrafluoroethylene. Polytetrafluoroethylene is preferably coated on the outer surface of the valve core 12 and the outer surface of the valve rod 22 by electroplating, to eliminate an adhesion of impurities in the fluid on the outer surfaces. In an embodiment, all parts, in contact with the fluid, in the male terminal 1 and the female terminal 2 are coated with polytetrafluoroethylene to further avoid the adhesion of impurities and to ensure the stability of the structure in long-term operation.

By adopting the first sealing ring 13, the second sealing ring 231, the third sealing ring 232 and the fourth sealing ring 26 in the fluid connector, as well as telescoping the valve rod 22 to push the valve core 12 to move to open the first fluid channel, and utilizing the hollow structure at the extended end of the valve rod 22 to enable the first fluid channel to be communicated with the second fluid channel, so that the outer periphery of the valve rod 22 is in press-fitting with the inner wall of the first sleeve 11, avoiding accumulation of impurities, ensuring the smooth resetting of the sealing structures at the male terminal 1 and the female terminal 2 of the fluid connector, and avoiding the occurrence of a short circuit and chip burnout caused by the sealing failure of the fluid connector and the ejecting of the fluid.

After the male terminal 1 and the female terminal 2 of the fluid connector return to original positions respectively, the internal structure of the fluid connector is press-fitting by the radial deformation of the multiple sealing rings, so as to avoid a situation that the sealing reliability is reduced due to the accumulation of impurities caused by the inflow of the fluid, avoid the leakage from the male terminal 1 and the female terminal 2, and effectively avoid the occurrence of circuit failures.

The above is only preferred embodiments of the present application, and is not intended to limit the present application. For those skilled in the art, various modifications and variations can be made to the present application. Any modifications, equivalent substitutions and improvements made within the spirit and principles of the present application shall be included in the scope of protection of the present application.

The invention claimed is:

1. A sealing structure for a fluid connector, comprising:
a first sealing ring; and
a first sleeve, wherein
the first sleeve is arranged in the fluid connector and is hollow inside to form a first fluid channel, and the first sealing ring is arranged on an inner surface of the first sleeve for sealing and communication of the first fluid channel; and
the sealing structure further comprises:
a second sealing ring and a first valve sleeve, wherein the first valve sleeve is arranged in the fluid connector, is hollow inside to form a second fluid channel and is connected with the first sleeve, and the second sealing ring is arranged on an inner surface of the first valve sleeve for sealing and communication of the second fluid channel;
a third sealing ring and a valve rod, wherein the valve rod is hollow inside and is slidably arranged in the first valve sleeve; the valve rod is further provided with a fluid through-hole through which an outer periphery of the valve rod is in communication with the second fluid channel, and the second sealing ring and the third sealing ring are both arranged on the inner surface of the first valve sleeve, and are respectively located at two sides of the fluid through-hole in an axial direction of the valve rod; and
a plurality of fourth sealing rings and a second sleeve, wherein the first valve sleeve is slidably arranged in the second sleeve, and the plurality of fourth sealing rings are sealingly arranged between the second sleeve and the first valve sleeve; the plurality of fourth sealing rings are spaced apart in an axial direction of the second sleeve, to make a connection position between the first sleeve and the first valve sleeve be always located among the plurality of fourth sealing rings during a sliding process.

2. The sealing structure according to claim 1, wherein the first sleeve is provided with a valve core which is slidably arranged in the first sleeve, and an outer periphery of the valve core is in sealing connection with the first sealing ring to close the first fluid channel.

3. The sealing structure according to claim 2, comprising a first spring, wherein the first spring is arranged in the first sleeve and one end of the first spring is connected to the valve core, and the valve core is in sealing connection with the first sealing ring.

4. The sealing structure according to claim 1, further comprising a second spring, wherein
the second spring is arranged in the first valve sleeve and sleeved outside the outer periphery of the valve rod, one end of the second spring is connected to the first valve sleeve, and the first valve sleeve is in sealing connection with the valve rod through the second sealing ring.

5. The sealing structure according to claim 1, comprising a first spring, wherein the first spring is arranged in the first sleeve and one end of the first spring is connected to a valve core, and the valve core is in sealing connection with the first sealing ring.

6. A fluid connector, comprising a sealing structure, wherein the sealing structure comprises:
a first sealing ring; and
a first sleeve, wherein
the first sleeve is arranged in the fluid connector and is hollow inside to form a first fluid channel, and the first sealing ring is arranged on an inner surface of the first sleeve for sealing and communication of the first fluid channel; and
the sealing structure further comprises:
a second sealing ring and a first valve sleeve, wherein the first valve sleeve is arranged in the fluid connector, is hollow inside to form a second fluid channel and is connected with the first sleeve, and the second sealing ring is arranged on an inner surface of the first valve sleeve for sealing and communication of the second fluid channel;
a third sealing ring and a valve rod, wherein the valve rod is hollow inside and is slidably arranged in the first valve sleeve; the valve rod is further provided with a fluid through-hole through which an outer periphery of the valve rod is in communication with the second fluid channel, and the second sealing ring and the third sealing ring are both arranged on the inner surface of the first valve sleeve, and are respectively located at two sides of the fluid through-hole in an axial direction of the valve rod; and
a plurality of fourth sealing rings and a second sleeve, wherein the first valve sleeve is slidably arranged in the second sleeve, and the plurality of fourth sealing rings are sealingly arranged between the second sleeve and the first valve sleeve; the plurality of fourth sealing rings are spaced apart in an axial direction of the second sleeve, to make a connection position between the first sleeve and the first valve sleeve be always located among the plurality of fourth sealing rings during a sliding process.

7. A fluid connector, comprising a male terminal and a female terminal which are detachably connected with each other, wherein the male terminal comprises a first sleeve, a first sealing ring, and a valve core which is arranged in the first sleeve, and the female terminal comprises a second sleeve, a first valve sleeve and a valve rod, wherein the first valve sleeve is slidably arranged between the second sleeve and the valve rod;
the first sleeve is hollow inside to form a first fluid channel, the first sealing ring is arranged on an inner surface of the first sleeve, the valve core is slidably arranged in the first fluid channel, and an outer periphery of the valve core is in sealing connection with the first sealing ring;
the valve rod is hollow inside to form a second fluid channel and is provided with a fluid through-hole through which an outer periphery of the valve rod is in communication with the second fluid channel; and
wherein the valve rod is configured to push the valve core to separate from the first sealing ring in a case that the male terminal and the female terminal are in connection with each other, and the valve rod is inserted into the first sleeve and the fluid through-hole is at least partially located in the first sleeve;

the fluid connector further comprises:
- a second sealing ring, wherein the second sealing ring is arranged on an inner surface of the first valve sleeve for sealing and communication of the second fluid channel;
- a third sealing ring, wherein the second sealing ring and the third sealing ring are both arranged on the inner surface of the first valve sleeve, and are respectively located at two sides of the fluid through-hole in an axial direction of the valve rod; and
- a plurality of fourth sealing rings, wherein the plurality of fourth sealing rings are sealingly arranged between the second sleeve and the first valve sleeve; the plurality of fourth sealing rings are spaced apart in an axial direction of the second sleeve, to make a connection position between the first sleeve and the first valve sleeve be always located among the plurality of fourth sealing rings during a sliding process.

8. The fluid connector according to claim 7, wherein the valve rod is configured to push the valve core to separate from the first sealing ring in the case that the male terminal and the female terminal are in connection with each other, the valve rod is inserted into the first sleeve so that the fluid through-hole is located in the first sleeve, and the first sealing ring is located at a side, away from the valve core, of the fluid through-hole, and is in sealing connection with the valve rod.

9. The fluid connector according to claim 8, wherein the female terminal further comprises a locking sleeve, a locking steel ball and a third spring, wherein the locking sleeve is sleeved outside the second sleeve, an accommodating hole for accommodating the locking steel ball is formed in a side wall at one end, configured to be connected with the male terminal, of the second sleeve, the third spring is arranged between the second sleeve and the locking sleeve, and one end of the third spring abuts against the locking sleeve; and
- wherein the locking sleeve is slidable between a first position and a second position in the axial direction of the second sleeve, when the locking sleeve is located at the first position, the locking sleeve is configured to press the locking steel ball into the accommodating hole, and when the locking sleeve is located at the second position, the locking steel ball is partially extended out between the locking sleeve and the second sleeve.

10. The fluid connector according to claim 8, wherein an outer surface of the valve core and an outer surface of the valve rod each is coated with polytetrafluoroethylene.

11. The fluid connector according to claim 7, wherein one end of the valve core and one end of the valve rod, which are in contact with each other, have the same shape of an end surface and the same outer diameter at the outer periphery.

12. The fluid connector according to claim 11, wherein the female terminal further comprises a locking sleeve, a locking steel ball and a third spring, wherein the locking sleeve is sleeved outside the second sleeve, an accommodating hole for accommodating the locking steel ball is formed in a side wall at one end, configured to be connected with the male terminal, of the second sleeve, the third spring is arranged between the second sleeve and the locking sleeve, and one end of the third spring abuts against the locking sleeve; and
- wherein the locking sleeve is slidable between a first position and a second position in the axial direction of the second sleeve, when the locking sleeve is located at the first position, the locking sleeve is configured to press the locking steel ball into the accommodating hole, and when the locking sleeve is located at the second position, the locking steel ball is partially extended out between the locking sleeve and the second sleeve.

13. The fluid connector according to claim 11, wherein an outer surface of the valve core and an outer surface of the valve rod each is coated with polytetrafluoroethylene.

14. The fluid connector according to claim 7, wherein the female terminal further comprises a locking sleeve, a locking steel ball and a third spring, wherein the locking sleeve is sleeved outside the second sleeve, an accommodating hole for accommodating the locking steel ball is formed in a side wall at one end, configured to be connected with the male terminal, of the second sleeve, the third spring is arranged between the second sleeve and the locking sleeve, and one end of the third spring abuts against the locking sleeve; and
- wherein the locking sleeve is slidable between a first position and a second position in the axial direction of the second sleeve, when the locking sleeve is located at the first position, the locking sleeve is configured to press the locking steel ball into the accommodating hole, and when the locking sleeve is located at the second position, the locking steel ball is partially extended out between the locking sleeve and the second sleeve.

15. The fluid connector according to claim 7, wherein an outer surface of the valve core and an outer surface of the valve rod each is coated with polytetrafluoroethylene.

* * * * *